US012478868B2

(12) United States Patent
Pan et al.

(10) Patent No.: US 12,478,868 B2
(45) Date of Patent: Nov. 25, 2025

(54) INFORMATION DETERMINING METHOD AND APPARATUS, DEVICE, AND STORAGE MEDIUM

(71) Applicant: Tencent Technology (Shenzhen) Company Limited, Guangdong (CN)

(72) Inventors: Da Pan, Shenzhen (CN); Zegao Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 259 days.

(21) Appl. No.: 18/340,520

(22) Filed: Jun. 23, 2023

(65) Prior Publication Data

US 2023/0330528 A1 Oct. 19, 2023

Related U.S. Application Data

(63) Continuation of application No. PCT/CN2022/120717, filed on Sep. 23, 2022.

(30) Foreign Application Priority Data

Oct. 20, 2021 (CN) ......................... 202111223472.X
Dec. 28, 2021 (CN) ......................... 202111625812.1

(51) Int. Cl.
*A63F 13/426* (2014.01)
*A63F 13/837* (2014.01)

(52) U.S. Cl.
CPC .......... *A63F 13/426* (2014.09); *A63F 13/837* (2014.09); *A63F 2300/8076* (2013.01)

(58) Field of Classification Search
CPC .................. A63F 13/426; A63F 13/837; A63F 2300/8076
See application file for complete search history.

(56) References Cited

U.S. PATENT DOCUMENTS 6,569,019 B2 * 5/2003 Cochran ................ F41A 33/00 341/20
8,506,369 B2 * 8/2013 Grant .................... A63F 13/428 463/2
(Continued)

FOREIGN PATENT DOCUMENTS

CN 108310764 A 7/2018
CN 110075521 A 8/2019
(Continued)

OTHER PUBLICATIONS

International Search Report for PCT/CN2022/120717 dated Dec. 16, 2022.

*Primary Examiner* — Malina D. Blaise
(74) *Attorney, Agent, or Firm* — Sughrue Mion, PLLC

(57) ABSTRACT

An information determining method and apparatus are provided. The method may include determining an aiming position of a virtual firearm being within an aiming assistance range of a target object. The method may further include determining, in response to a sequence of consecutive target firing operations for the virtual firearm, an aiming assistance strength of the virtual firearm based on the sequence. The method may further include providing, based on the aiming assistance strength, a first offset for drawing an aiming position of the virtual firearm to the target object; and controlling the virtual firearm to shoot based on the aiming position.

20 Claims, 11 Drawing Sheets

(56) References Cited

U.S. PATENT DOCUMENTS

| | | | | |
|---|---|---|---|---|
| 2010/0173686 A1* | 7/2010 | Grant | F41A 33/06 | |
| | | | 463/2 | |
| 2016/0084605 A1* | 3/2016 | Monti | A63F 13/245 | |
| | | | 463/2 | |
| 2021/0286446 A1* | 9/2021 | Wang | G06F 3/04847 | |

FOREIGN PATENT DOCUMENTS

| | | | |
|---|---|---|---|
| CN | 111202975 | A | 5/2020 |
| CN | 112121416 | A | 12/2020 |
| CN | 114191811 | A | 3/2022 |

* cited by examiner

INFORMATION DETERMINING METHOD AND APPARATUS, DEVICE, AND STORAGE MEDIUM

CROSS REFERENCE TO RELATED APPLICATION

This application is a continuation of International Application No. PCT/CN2022/120717, filed on Sep. 23, 2022 and claims priority to Chinese Patent Application No. 202111223472.X filed with the China National Intellectual Property Administration on Oct. 20, 2021 and Chinese Patent Application No. 202111625812.1 filed with the China National Intellectual Property Administration on Dec. 28, 2021, the contents of which are incorporated by reference herein in their entirety.

FIELD

Embodiments of the disclosure relate to the field of computer and Internet technologies, and in particular, to an information determining method and apparatus, a device, and a storage medium.

BACKGROUND

Currently, a user may control a virtual object to use a virtual firearm to perform virtual shooting.

In the related art, before controlling a virtual object to use a virtual firearm to perform virtual shooting, the user may aim at a hostile virtual object in virtual objects according to an observed virtual environment, so as to control the virtual object to use the virtual firearm by means of a firing operation for the virtual firearm. Further, the user shoots, according to a position aimed by the user, a virtual bullet to the position.

However, in the foregoing related art, only depending on the user to aim at the hostile virtual object for virtual shooting, the shooting hit rate is low and the user interaction experience is poor. Moreover, the user generally needs to trigger a firing operation for the virtual firearm multiple times, and thus the operation efficiency of this method is relatively low.

SUMMARY

According to one aspect of embodiments of this application, an information determining method is provided. The method may include determining an aiming position of a virtual firearm being within an aiming assistance range of a target object. The method may further include determining, in response to a sequence of consecutive target firing operations for the virtual firearm, an aiming assistance strength of the virtual firearm based on the sequence. The method may further include providing, based on the aiming assistance strength, a first offset for drawing an aiming position of the virtual firearm to the target object; and controlling the virtual firearm to shoot based on the aiming position.

According to other aspects of one or more embodiments, there is also provided an apparatus and non-transitory computer readable medium consistent with the method.

BRIEF DESCRIPTION OF THE DRAWINGS

To describe the technical solutions in the example embodiments of the disclosure more clearly, the following briefly introduces the accompanying drawings required for describing the example embodiments. The accompanying drawings in the following description show merely some embodiments of the disclosure, and a person of ordinary skill in the art may still derive other accompanying drawings from the accompanying drawings without creative efforts. In addition, one of ordinary skill would understand that aspects of example embodiments may be combined together or implemented alone.

DETAILED DESCRIPTION

To make the objectives, technical solutions, and advantages of the disclosure clearer, implementations of the disclosure are further described in detail below with reference to the accompanying drawings.

Figure 1:
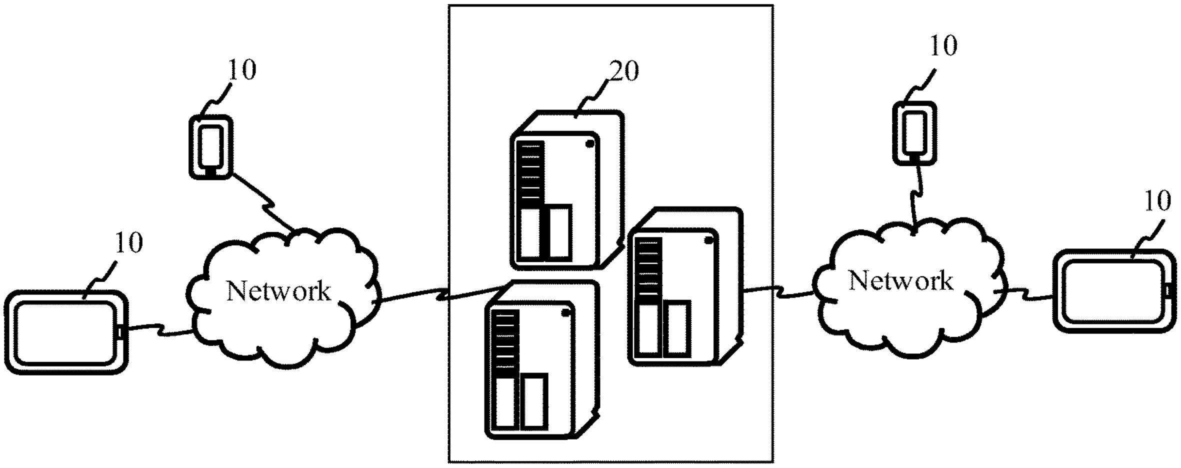
FIG. 1 is a schematic diagram of an information determining system provided according to some embodiments.

FIG. 1 is a schematic diagram of an information determining system provided according to some embodiments. The information determining system may include: a terminal 10 and a server 20.

The terminal 10 may be an electronic device such as a mobile phone, a tablet computer, a game console, an e-reader, a multimedia playback device, a wearable device, and a personal computer (PC). A client of an application (e.g., a game application) may be installed in the terminal 10. The application may be an application needing to be downloaded and installed, or may be a click-to-run application. This is not limited in the embodiments of the disclosure.

In the embodiments of the disclosure, the application be any application capable of controlling a virtual firearm to perform a firing operation. Exemplarily, the application may be a third-personal shooting game (TPS), a first-person shooting game (FPS), a multiplayer shooting survival game, a multiplayer online battle arena (MOBA) game, a virtual reality (VR) shooting application, an augmented reality (AR) application, a three-dimensional map application, or the like.

The server 20 is configured to provide a background service for the client of the application in the terminal 10. For example, the server 20 may be a background server of the application. The server 20 may be a server, or a server cluster composed of a plurality of servers, or a cloud computing service center. The server 20 may simultaneously provide background services for applications in a plurality of terminals 10.

The terminal 10 and the server 20 may communicate with each other by means of a network.

In some embodiments, when a virtual firearm is controlled to perform a firing operation, aiming information of the virtual firearm is determined by a shooting auxiliary mechanism and a recoil action mechanism of the virtual firearm. In some embodiments, the server 20 provides the aiming information to the terminal 10 according to the shooting auxiliary mechanism and the recoil action mechanism of the virtual firearm. In another possible implementation, the terminal 10 automatically determine the aiming information of the virtual firearm according to the shooting auxiliary mechanism and the recoil action mechanism of the virtual firearm. This is not limited in the embodiments of the disclosure. The shooting auxiliary mechanism is a mechanism used for assisting a player in aiming to increase the hit rate, and the recoil action mechanism is a mechanism simulating a recoil produced by a real firearm during shooting. In some embodiments, the aiming information of the virtual firearm is determined in combination with the shooting auxiliary mechanism and the recoil action mechanism, so as to assist the virtual firearm to perform virtual shooting.

The disclosure is described below with reference to specific embodiments.

Figure 2:
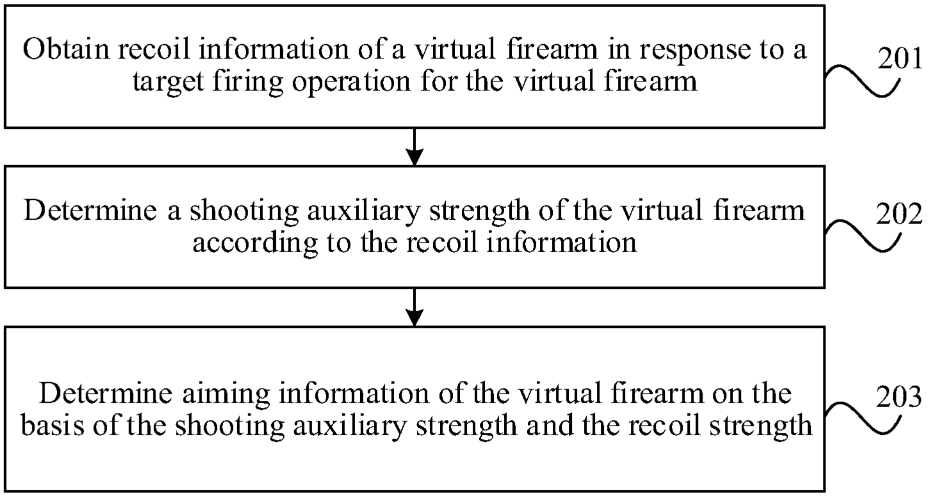
FIG. 2 is a flowchart of an information determining method provided according to some embodiments FIG. 3 exemplarily shows a schematic diagram of effects of a shooting auxiliary strength and a recoil action strength according to some embodiments.

FIG. 2 is a flowchart of an information determining method according to some embodiments. The method may be applied in a computer device, the computer device may be the terminal 10 shown in FIG. 1, an execution subject of the operations may be a client of an application installed in the terminal 10. The computer device may be the server 20 shown in FIG. 1. The information determining method may include operation 201 to operation 203:

Operation 201: Obtain recoil information of a virtual firearm in response to a target firing operation for the virtual firearm.

The virtual firearm is a virtual item capable of performing virtual firing (also called virtual shooting). The application may provide different types of virtual firearms for the user, such as a virtual rifle, a virtual submachine gun, a virtual sniper rifle, and a virtual pistol.

The firing operation is an operation used for controlling a virtual firearm to perform virtual shooting, and the target firing operation is any firing operation of the virtual firearm, for example, the target firing operation is a certain firing operation in a plurality of continuous firing operations. The user may control the virtual firearm to perform virtual firing once or continuously by means of various modes such as a click operation, a press operation, a double-click operation, a voice operation, eye control, and somatosensory control. The application may provide a virtual firing control on a user interface, a user may use the virtual firing control on the user interface to trigger and generate a firing operation for the virtual firearm. That is, the virtual firearm is controlled to perform virtual shooting. The user may also select an auxiliary shooting mode to automatically control the virtual firearm to perform virtual shooting.

The recoil information may include information related to a recoil strength of the virtual firearm, and the recoil is a reaction force received by the virtual firearm during virtual shooting. The recoil strength is used for indicating the strength of a simulated recoil received by the virtual firearm after firing. The recoil information includes but is not limited to at least one of the following: an order of the target firing operation in a plurality of continuous firing operations, a plurality of recoil action phases of the virtual firearm, and an auxiliary strength base corresponding to a firing state of the virtual firearm, which are introduced one by one subsequently.

In some embodiments, upon detecting a target firing operation for controlling the virtual firearm to perform virtual firing, the computer device obtains the recoil information of the virtual firearm. For example, upon detecting any trigger operation on the virtual firing control, the computer device determines that the target firing operation for controlling the virtual firearm to perform virtual firing is triggered.

In some embodiments, after obtaining the recoil information, the computer device may determine a recoil strength of the virtual firearm on the basis of the recoil information, and generate a jitter parameter of the virtual firearm according to the recoil strength, so as to generate and display a jitter animation of the virtual firearm according to the jitter parameter. In the jitter animation, the virtual firearm fluctuates in at least one direction (such as at least one of horizontal and vertical directions) of a gun body thereof.

In some embodiments, the firing is also called as shooting. That is, controlling firing of the virtual firearm may be also called as controlling shooting of the virtual firearm.

Operation 202: Determine a shooting auxiliary strength of the virtual firearm according to the recoil information.

In some embodiments, after obtaining the recoil information, the computer device determines a shooting auxiliary strength of the virtual firearm according to the recoil information.

The shooting auxiliary strength is used for determining an offset for drawing an aiming position of the virtual firearm to a target object (i.e., a shooting target). The offset may be positively correlated with the shooting auxiliary strength, that is, the higher the shooting auxiliary strength is, the larger the offset is. Thus, a large offset is required to draw the aiming position to the target object. On the contrary, the lower the shooting auxiliary strength is, the smaller the offset is. Relatively, only a small offset is required to draw the aiming position to the target object. The aiming position is an actual aiming position of the virtual firearm.

In some embodiments, the computer device may directly determine the shooting auxiliary strength according to the contents included in the recoil information. The computer device stores a corresponding relationship between the recoil information and the shooting auxiliary strength. After obtaining the recoil information, the computer device determines, according to the stored corresponding relationship, a shooting auxiliary strength corresponding to the recoil information, and then determines that the shooting auxiliary strength corresponding to the recoil information as the shooting auxiliary strength of the virtual firearm. The corresponding relationship between the recoil information and the shooting auxiliary strength may be stored in the computer device in the form of a table, or stored in the computer device in the form of a curve. This is not limited in the embodiments of the disclosure.

In some embodiments, the computer device may first determine a recoil strength according to the contents included in the recoil information, and then determine the shooting auxiliary strength according to the recoil strength. The computer device may store a corresponding relationship between the recoil strength and the shooting auxiliary strength. For example, the corresponding relationship reflects that the recoil strength is inversely proportional to the shooting auxiliary strength. That is, when the recoil strength has a maximum value, the shooting auxiliary strength has a minimum value, and when the recoil strength has a minimum value, the shooting auxiliary strength has a maximum value. After obtaining the recoil information, the computer device determines a recoil strength of the virtual firearm on the basis of the recoil information, then determines, according to the stored corresponding relationship, a shooting auxiliary strength corresponding to the recoil strength, and determines the shooting auxiliary strength corresponding to the recoil strength as the shooting auxiliary strength of the virtual firearm.

Operation 203: Determine aiming information of the virtual firearm on the basis of the shooting auxiliary strength and the recoil strength.

In some embodiments, after obtaining the shooting auxiliary strength, the computer device determines aiming information of the virtual firearm on the basis of the shooting auxiliary strength and the recoil strength.

When determining the aiming information of the virtual firearm, the computer device may determine a first offset of the aiming position according to the shooting auxiliary strength, the first offset being an offset determined on the basis of the shooting auxiliary strength and used for drawing the aiming position to the target object, and the computer device determines a second offset of the aiming position according to the recoil strength, the second offset being an offset determined on the basis the recoil strength and used for drawing the aiming position to the target object. Further, the computer device adjusts the aiming position of the virtual firearm according to the first offset and the second offset to obtain aiming information of the virtual firearm.

The virtual firearm may have a plurality of recoil action phases, and different recoil action phases correspond to different recoil strengths and different shooting auxiliary strengths. Because each recoil action phase has different recoil strength and different shooting auxiliary strength, when the computer determines the aiming information of the virtual firearm, the computer device needs to respectively determine, according to the foregoing mode, the aiming information corresponding to each recoil action phase. For example, for a target recoil action phase in the plurality of recoil action phases (i.e., any recoil action phase in the plurality of recoil action phases), the computer device determines a first offset of an aiming position of the target recoil action phase according to a shooting auxiliary strength of the target recoil action phase, determines a second offset of the aiming position of the target recoil action phase according to a recoil strength of the target recoil action phase, and then adjusts the aiming position of the virtual firearm according to the first offset and the second offset to obtain aiming information of the target recoil action phase.

The aiming information may include at least one of the following: a sight position of the virtual firearm and a bullet position of the virtual firearm.

In some embodiments, the aiming information includes a sight position of the virtual firearm. After obtaining the shooting auxiliary strength and the recoil strength, the computer device may adjust the aiming position of the virtual firearm on the basis of the shooting auxiliary strength and the recoil strength, so as to obtain a sight position of the virtual firearm. The aiming position is a hit position of the virtual firearm without a recoil and shooting assistance. The sight position is a hit position of the virtual firearm with effects of a recoil and shooting assistance. In this case, after obtaining the sight position, the computer device displays, to the user in the user interface, the sight position instead of the aiming position.

In some embodiments, the aiming information includes a bullet position of the virtual firearm. After obtaining the shooting auxiliary strength and the recoil strength, the computer device may adjust the aiming position of the virtual firearm on the basis of the shooting auxiliary strength and the recoil strength, so as to obtain a bullet position of the virtual firearm. The aiming position is a hit position of a virtual bullet of the virtual firearm without a recoil and shooting assistance. The sight position is a hit position of a virtual bullet of the virtual firearm with effects of a recoil and shooting assistance. In this case, after obtaining the bullet position, the computer device directly displays, to the user in the user interface, a hit position of the virtual bullet instead of the aiming position.

In some embodiments, the aiming information may include an aiming assistance range of the target object. The aiming assistance range surrounds a hit range of the target object and does not include the hit range of the target object.

The virtual bullet may be any type of virtual item shot by the virtual firearm.

The recoil strength may be determined according to the recoil information.

In some embodiments, the recoil strength is determined by calculation according to the recoil information. After obtaining the recoil information, the computer device may determine a recoil strength of the virtual firearm on the basis of the recoil information.

In some embodiments, the recoil strength is set on basis of the recoil information A designer may preset a corresponding relationship between the recoil strength and the recoil information, and store the corresponding relationship in the computer device. After obtaining the recoil information, the computer device determines, on the basis of the stored corresponding relationship, a recoil strength corresponding to the recoil information, and determines the recoil strength corresponding to the recoil information as a recoil strength of the virtual firearm.

In summary, in the technical solutions provided by the embodiments of the disclosure, the aiming position of the virtual firearm is determined by means of the shooting auxiliary strength. That is, during a firing process of the virtual firearm, the aiming information of the virtual firearm is adjusted by means of the shooting auxiliary strength, so as to increase the hit rate of the virtual firearm. Moreover, during the process of adjusting the aiming position of the virtual firearm according to the shooting auxiliary strength, the influence of the recoil of the virtual firearm on the aiming position is also considered, so that the content displayed by the aiming information of the virtual firearm is more realistic, that is, a virtual firing effect presented by the aiming information of the virtual firearm after firing better conforms to a real virtual firearm firing effect, thereby improving the user interaction experience and a shooting visual effect. That is, during the process of adjusting the aiming position of the virtual firearm according to the shooting auxiliary strength, the influence of the recoil of the virtual firearm on the aiming position is also considered, that is, the two are coupled to take effect. Compared with the problem that the recoil experience after firing is completely weakened due to independently taking effect (i.e., the shooting assistance completely takes effect, and direct firing may be performed without manipulation of the user) or shooting assistance may not take effect due to the fact that the recoil of the virtual firearm after firing is extremely strong), some embodiments implement the adjustment of the shooting auxiliary strength on the basis of the recoil strength, so that the user may obtain a shooting experience of the recoil retained during firing, and may also obtain an experience effect of shooting assistance. Furthermore, the aiming information of the virtual firearm is adjusted by means of the shooting auxiliary strength, so that a sight position or a hit position is closer to a target object, increasing the hit rate of the virtual firearm, reducing the number of times of triggering of a firing operation for the virtual firearm, and improving the operation efficiency.

A shooting auxiliary strength obtaining mode is introduced below. The recoil information may include but is not limited to at least one of the following: the order or sequence of the target firing operation in a plurality of continuous firing operations, a plurality of recoil action phases of the virtual firearm, and an auxiliary strength base corresponding to a firing state of the virtual firearm.

In some embodiments, the recoil information comprises the order of the target firing operation in a plurality of continuous firing operations, and the order is positively correlated with the recoil strength. The recoil information may also include an ordinal number that defines the position of a target firing operation in an order or sequence of continuous firing operations. In some embodiments, after obtaining the order of the target firing operation in the plurality of continuous firing operations, the computer device determines a shooting auxiliary strength of the virtual firearm on the basis of the order.

In embodiments, the computer device stores a corresponding relationship between the order and the shooting auxiliary strength. After obtaining the foregoing order of the target firing operation, the computer device may determine, on the basis of the stored corresponding relationship, a shooting auxiliary strength corresponding to the order, and determine the shooting auxiliary strength corresponding to the order as the shooting auxiliary strength of the virtual firearm.

In some embodiments, the computer device stores a corresponding relationship between the recoil strength and the shooting auxiliary strength. After obtaining the order of the target firing operation, the computer device may determine a recoil strength of the virtual firearm on the basis of the order, determine, according to the stored corresponding relationship, a shooting auxiliary strength corresponding to the recoil strength, and determine the shooting auxiliary strength corresponding to the recoil strength as the shooting auxiliary strength of the virtual firearm.

Figure 3:
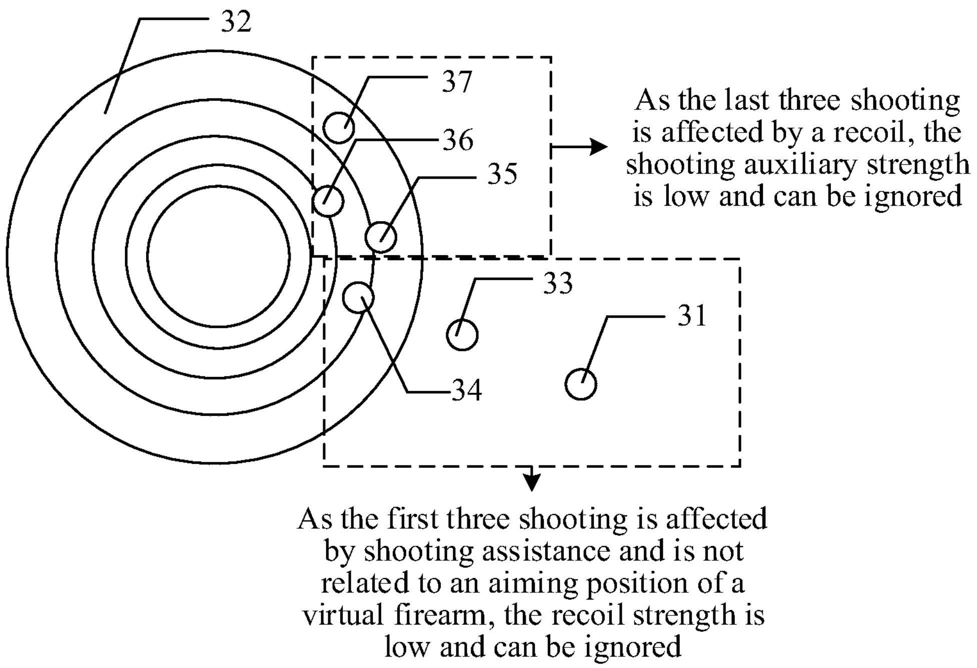

In some embodiments, the computer device may store relationships between the order, the shooting auxiliary strength, and the recoil strength at the same time. As shown in FIG. 3, in a case that the order is gradually increased, the shooting auxiliary strength of the virtual firearm is gradually weakened, and the recoil strength of the virtual firearm is gradually increased. That is to say, during a continuous firing process of the virtual firearm, the shooting assistance received by the virtual firearm is gradually weakened, and the recoil received by the virtual firearm is gradually increased. As shown in FIG. 3, a hit range of a target object 32 is an annular area range. During a continuous firing process of the virtual firearm at a same aiming position, the shooting auxiliary strength is high and the recoil strength is low during the first three continuous firing of the virtual firearm, and the first three continuous firing is affected by the shooting auxiliary strength. A hit position 31 is far away from the target object 32 during the first firing, a hit position 33 is closer to the target object 32 during the second firing, and a hit position 34 hits the target object 32 during the third firing. As the hit positions of the first three firing are affected by the shooting assistance and are not related to the aiming position of the virtual firearm, the recoil strength is low and may be ignored. The shooting auxiliary strength is low and the recoil strength is high during the last three continuous firing of the virtual firearm. The hit positions are affected by the recoil strength. For example, a hit position 35 during the fourth firing, a hit position 36 during the fifth firing, and a hit position 37 during the sixth firing are all changed on the basis of the hit position 34 during the third firing. In this case, the hit positions are mainly affected by the recoil, and the shooting auxiliary strength is low and may be ignored.

In some embodiments, the recoil information includes a plurality of recoil action phases of the virtual firearm. Different recoil action phases correspond to different recoil strengths. Moreover, in this case, the shooting auxiliary strength includes shooting auxiliary strengths respectively corresponding to the plurality of recoil action phases.

The recoil action phases corresponding to the virtual firearm may be flexibly divided according to actual situations. This is not limited in the embodiments of the disclosure. For example, the recoil action phases are divided according to a flight duration of a virtual bullet, for example, in a case that the flight duration of the virtual bullet is 0.5 s, 0.1 s is taken as a recoil action phase for dividing, to obtain five recoil action phases. Or, the recoil action phases are divided according to a motion state of the virtual firearm after receiving a recoil after firing. For example, in a case that the virtual firearm is first lifted and stays on the top and then falls back after receiving a recoil, the recoil action phases are divided according to the motion state, to obtain three recoil action phases: a lifting phase, a staying phase, and a fall-back phase. The quantity of the recoil action phases corresponding to the virtual firearm may be flexibly set and adjusted. This is not limited in the embodiments of the disclosure.

In some embodiments, after obtaining the plurality of recoil action phases of the virtual firearm, the computer device determines a shooting auxiliary strength respectively corresponding to each recoil action phase.

In some embodiments, the computer device stores a corresponding relationship between the recoil action phase and the shooting auxiliary strength, and different recoil action phases correspond to different shooting auxiliary strengths. After obtaining the plurality of recoil action phases corresponding to the target firing operation, the computer device may determine, on the basis of the stored corresponding relationship, a shooting auxiliary strength of the virtual firearm respectively corresponding to each recoil action phase.

In some embodiments, the computer device stores a corresponding relationship between the recoil strength and the shooting auxiliary strength. After obtaining the recoil action phases, the computer device may determine a recoil strength of the virtual firearm respectively corresponding to each recoil action phase, and then determine, on the basis of the stored corresponding relationship, a shooting auxiliary strength of the virtual firearm respectively corresponding to each recoil action phase.

In some embodiments, the computer device may also store the relationships between the recoil action phase, the shooting auxiliary strength, and the recoil strength at the same time. This is not limited in the embodiments of the disclosure.

In some embodiments, the recoil information includes an auxiliary strength base corresponding to a shooting state corresponding to the target firing operation of the virtual firearm, different shooting states correspond to different recoil strengths, and different shooting states correspond to different auxiliary strength bases. The shooting state is used for indicating a shooting mode of the virtual firearm, such as shooting with a sighting telescope and waist shooting.

In some embodiments, after obtaining the auxiliary strength base corresponding to the shooting state of the virtual firearm, the computer device determines a shooting auxiliary strength on the basis of the auxiliary strength base.

In some embodiments, the computer device stores a corresponding relationship between the auxiliary strength base and the shooting auxiliary strength. After obtaining the auxiliary strength base, the computer device may determine, on the basis of the stored corresponding relationship, a shooting auxiliary strength corresponding to the auxiliary strength base, and determine the shooting auxiliary strength corresponding to the auxiliary strength base as the shooting auxiliary strength of the virtual firearm.

In some embodiments, the computer device stores a corresponding relationship between the recoil strength and the shooting auxiliary strength. After obtaining the auxiliary strength base, the computer device may determine a recoil strength on the basis of the auxiliary strength base, then determine, according to the stored corresponding relationship, a shooting auxiliary strength corresponding to the recoil strength, and determine the shooting auxiliary strength corresponding to the recoil strength as the shooting auxiliary strength of the virtual firearm.

In some embodiments, the computer device may also store the relationships between the auxiliary strength base, the shooting auxiliary strength, and the recoil strength at the same time.

The order of the target firing operation in the plurality of continuous firing operations, the plurality of recoil action phases of the virtual firearm, and the auxiliary strength bases corresponding to shooting states of the virtual firearm are respectively introduced above. In exemplary embodiments, the recoil information may include any one, any two, or all of the three. This is not limited in the embodiments of the disclosure.

In some embodiments, the recoil information may also directly include the recoil strength of the virtual firearm. This is not limited in the embodiments of the disclosure.

An aiming information determining mode is introduced below.

In some embodiments, operation 203 includes the following operations:

1. Determine a first offset of an aiming position according to the shooting auxiliary strength;

In some embodiments, after obtaining the shooting auxiliary strength, the computer device determines a first offset of an aiming position according to the shooting auxiliary strength.

The first offset may include an offset direction of the aiming position, and a displacement distance of the aiming position in the offset direction.

In some embodiments, when obtaining the first offset, the computer device may determine a first offset direction of the aiming position according to a positional relationship between the aiming position and the target object. The first offset direction is an action direction of the shooting auxiliary strength. Then, the computer device determines a first displacement parameter of the aiming position according to the shooting auxiliary strength. The first displacement parameter is used for indicating a displacement distance of the aiming position in the first offset direction. In this case, the first offset includes the first offset direction and the first displacement parameter. The first displacement parameter may directly include the displacement distance, for example, the first displacement parameter is 1 m, 2 m, 3 m, or the like. Or, the first displacement parameter may include a position after displacement, for example, the first displacement parameter is displacement to the head of the target object.

The first offset direction may include a horizontal direction and/or a vertical direction. The horizontal direction is parallel to a horizontal plane of a virtual environment in which the virtual firearm is located, and the vertical direction is perpendicular to the horizontal plane.

In some embodiments, the first offset direction includes a horizontal direction or a vertical direction. When obtaining the first offset direction, the computer device obtains a horizontal distance and a vertical distance between the aiming position and the target object. The horizontal distance is a distance between a center point of the target object and the aiming position in the horizontal direction, and the vertical distance is a distance between the center point of the target object and the aiming position in the vertical direction. Or, the horizontal distance is the shortest distance between a boundary point of the target object and the aiming position in the horizontal direction, and the vertical distance is the shortest distance between the boundary point of the target object and the aiming position in the vertical direction. Or, the horizontal distance is the shortest distance between a boundary point of a hit range of the target object and the aiming position in the horizontal direction, and the vertical distance is the shortest distance between the boundary point of the hit range of the target object and the aiming position in the vertical direction. Further, the computer device compares the horizontal distance with the vertical distance. If the horizontal distance is less than or equal to the vertical distance, the first offset direction is determined as the horizontal direction; and if the horizontal distance is greater than the vertical distance, the first offset direction is determined as the vertical direction.

The horizontal direction and the vertical direction may be represented by non-directional straight lines, or may be represented by directional rays. Exemplarily, if the horizontal direction and the vertical direction are represented by non-directional straight lines, the content contained in the first offset may be: moving 1 meter rightward in the horizontal direction. If the horizontal direction and the vertical direction are represented by directional rays, when the horizontal direction is parallel to the horizontal plane rightward, the content contained in the first offset may be: −2 meter (i.e., moving 2 meters leftward in the horizontal direction).

In some embodiments, the first offset direction includes the horizontal direction and the vertical direction. When obtaining the first offset direction, the computer device obtains a connection line corresponding to the shortest distance between the aiming position and the target object, and determines the direction of the connection line as the first offset direction. The shortest distance is a shortest distance between the aiming position and the boundary point of the aiming position, or, the shortest distance is a shortest distance between the aiming position and a boundary point of a hit range of the target object. The direction of the connection line is a direction from the aiming position to the target object.

2. Determine a second offset of the aiming position according to the recoil strength.

In some embodiments, after obtaining the recoil strength, the computer device determines a second offset of the aiming position according to the recoil strength.

The second offset may include an offset direction of the aiming position, and a displacement distance of the aiming position in the offset direction.

In some embodiments, when obtaining the second offset, the computer device first determines a second offset direction of the aiming position. The second offset direction is an action direction of the recoil strength, and the second offset direction includes a horizontal action direction and a vertical action direction. Further, the computer device determines a second displacement parameter of the aiming position according to the recoil strength. The second displacement parameter is used for indicating a displacement distance of the aiming position in the horizontal action direction, and a displacement distance of the aiming position in the vertical action direction. In this case, the second offset includes the second offset direction and the second displacement parameter. The horizontal action direction is parallel to the horizontal plane of the virtual environment in which the virtual firearm is located, and the vertical action direction is perpendicular to the horizontal plane.

In some embodiments, different shooting poses corresponds different second offset directions. When obtaining the second offset direction, the computer device determines the second offset direction on the basis of a shooting pose of the virtual firearm. The shooting pose is used for indicating a firing pose of a firearm user during firing of the virtual firearm, such as shooting from the right of the waist, shooting from the left of the waist, shooting with a left sighting telescope, and shooting with a right sighting telescope.

3. Adjust the aiming position of the virtual firearm according to the first offset and the second offset, to obtain aiming information of the virtual firearm.

In some embodiments, after obtaining the first offset and the second offset, the computer device adjusts the aiming position of the virtual firearm according to the first offset and the second offset, to obtain aiming information of the virtual firearm.

Figure 4:
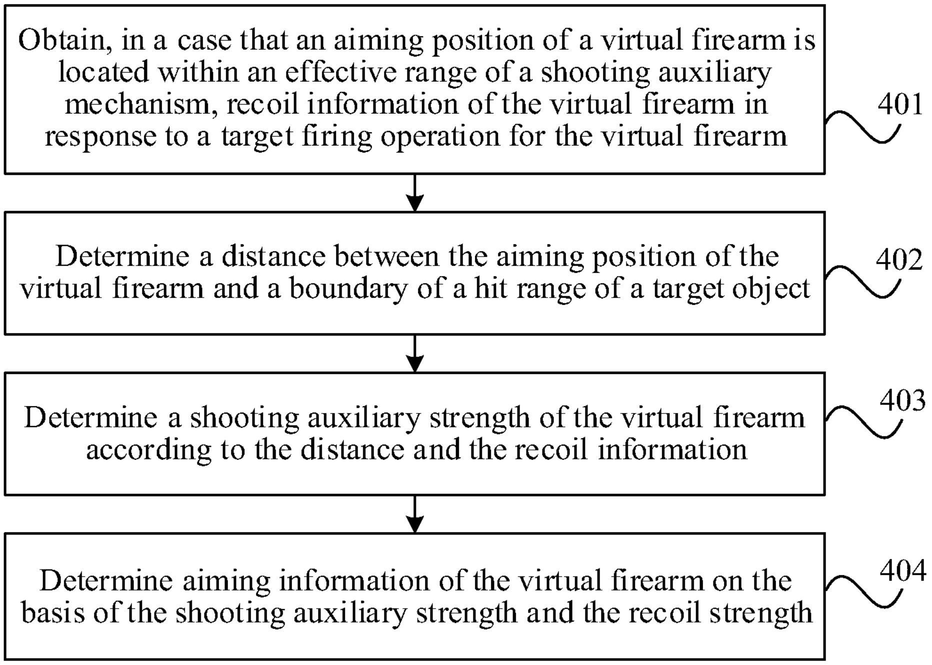
FIG. 4 is a flowchart of an information determining method provided according to some embodiments.

FIG. 4 is a flowchart of an information determining method provided according to another embodiment of this application. The method may be applied in a computer device, the computer device may be the terminal 10 shown in FIG. 1, an execution subject of the operations may be a client of an application installed in the terminal 10. The computer device may be the server 20 shown in FIG. 1, and the method may include the following operations (401-404):

Operation 401: Obtain recoil information of a virtual firearm in response to a target firing operation for the virtual firearm when an aiming position of the virtual firearm is located within an effective range of a shooting auxiliary mechanism.

The shooting auxiliary mechanism may correspond to an effective range. When the aiming position of the virtual firearm is located within the effective range, the shooting assistance for the virtual firearm takes effect.

In some embodiments, the computer device detects the aiming position of the virtual firearm. If the aiming position is located within the effective range of the shooting auxiliary mechanism, the computer device obtains recoil information of the virtual firearm when determining that the target firing operation for the virtual firearm is detected, and executes the following operations 402-404 according to the recoil information, so as to determine the aiming information of the virtual firearm. If the aiming position is located outside the effective range of the shooting auxiliary mechanism, the computer device does not execute the following operations 402-404 when determining that the target firing operation for the virtual firearm is detected, keeps the aiming position of the virtual firearm unchanged, and determines the aiming information of the virtual firearm according to the aiming position of the virtual firearm.

Figure 5:
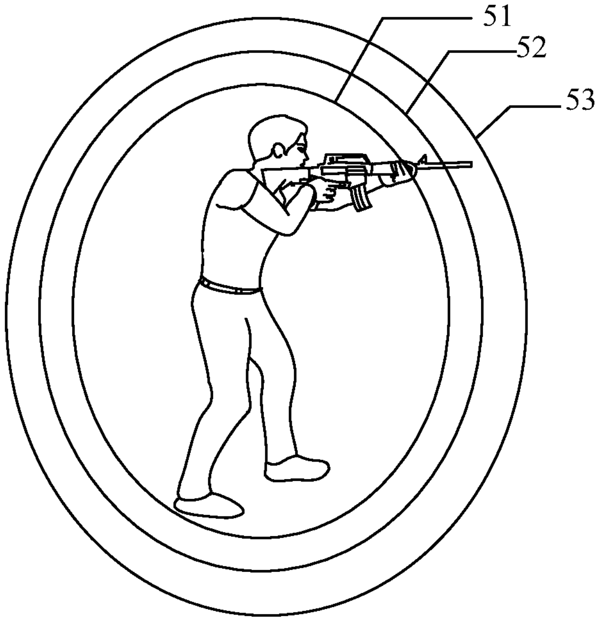
FIG. 5 exemplarily shows a schematic diagram of an effective range according to some embodiments.

The effective range is an area within a detection range of the target object excluding a hit range of the target object, the hit range of the target object is an area for determining that the target object is hit, and the detection range is an area which includes and is greater than the hit range of the target object. For example, as shown in FIG. 5, an area around a display range 51 of the target object is a hit range 52 of the target object, and an area around the hit range 52 of the target object is an effective range 53 of the shooting auxiliary mechanism. The hit range 52 includes the display range 51, and the effective range 53 does not include the hit range 52.

In some embodiments, when determining whether the aiming position is located within the effective range of the shooting auxiliary mechanism, the computer device firstly obtains a hit range of the target object closest to the aiming position, and then obtains a closest distance between the aiming position and the closest hit range of the target object.

The closest distance may be a distance between the aiming position and a boundary of the closest hit range, or may be a distance between the aiming position and a boundary point of a closest hit range. In a possible implementation, the hit range is a rectangular range. After obtaining the aiming position and the hit range, the computer device determines a boundary of the hit range closest to the aiming position, and determines a vertical distance between the aiming position and the boundary as the closest distance. In another possible implementation, the hit range is an irregular range. After obtaining the aiming position and the hit range, the computer device determines a boundary point of the hit range closest to the aiming position, and determines a straight-line distance between the aiming position and the boundary point as the closest distance.

After obtaining the closest distance, the computer device may compare the closest distance with a threshold. If the closest distance is less than or equal to the threshold, the computer device determines that the aiming position is located within the effective range of the shooting auxiliary mechanism; and if the closest distance is greater than the threshold, the computer device determines that the aiming position is located outside the effective range of the shooting auxiliary mechanism. The threshold is determined according to a distance between a boundary of the hit range and a boundary of the effective range.

In some embodiments, the computer device may also determine, according to a relationship between coordinates of the aiming position and coordinates contained in the effective range, whether the aiming position is located within the effective range. Exemplarily, if the coordinates contained within the effective range include the coordinates of the aiming position, the computer device determines that the aiming position is located within the effective range; and if the coordinates contained within the effective range do not include the coordinates of the aiming position, the computer device determines that the aiming position is located outside the effective range.

Operation 402: Determine a distance between the aiming position of the virtual firearm and a boundary of a hit range of the target object.

In some embodiments, after determining that the aiming position of the virtual firearm is located within the effective range of the shooting auxiliary mechanism, the computer device determines a distance between the aiming position of the virtual firearm and a boundary of a hit range of the target object. The distance is a shortest distance between the aiming position and the boundary of the hit range of the target object.

Operation 403: Determine a shooting auxiliary strength of the virtual firearm according to the distance and the recoil information.

In some embodiments, after obtaining the distance and the recoil information, the computer device determines a shooting auxiliary strength of the virtual firearm according to the distance and the recoil information. The distance is negatively correlated with the shooting auxiliary strength, that is, the shorter the distance is, the higher the shooting auxiliary strength is, and a larger first offset is required to draw the aiming position of the virtual firearm to the target object (i.e., a shooting object). On the contrary, the longer the distance is, the lower the shooting auxiliary strength is, and relatively, only a small first offset is required to draw the aiming position to the target object.

The recoil information may include but is not limited to at least one of the following: the order of the target firing operation in a plurality of continuous firing operations, a plurality of recoil action phases of the virtual firearm, and an auxiliary strength base corresponding to a firing state of the virtual firearm. The recoil information is specifically introduced above. Details are not described herein again.

In some embodiments, if the recoil information simultaneously includes: the order of the target firing operation in a plurality of continuous firing operations, the plurality of recoil action phases of the virtual firearm, and an auxiliary strength base corresponding to a firing state of the virtual firearm, the relationship between calculation parameters of the shooting auxiliary strength may be represented as:

shooting auxiliary strength=(order parameter*recoil action phase parameter*auxiliary strength base)/distance.

The formula only represents the relationship between the parameters, and does not represent a specific calculation method of the shooting auxiliary strength.

Operation 404: Determine aiming information of the virtual firearm on the basis of the shooting auxiliary strength and the recoil strength.

Operation 404 is the same as operation 203 in the embodiment of FIG. 2. For details, reference may be made to the embodiment of FIG. 2. Details are not described herein again.

In summary, in the technical solutions provided by the embodiments of the disclosure, the shooting auxiliary strength is constrained from a spatial perspective of the effective range of the shooting auxiliary mechanism and a time perspective of the recoil information, so as to improve a coupling effect between the shooting auxiliary strength and the recoil strength. The coupling effect enables a virtual firing effect presented by the aiming information of the virtual firearm after firing to better conform to a real firing effect of the virtual firearm, and improves the user interaction experience and a shooting visual effect.

Figure 6:
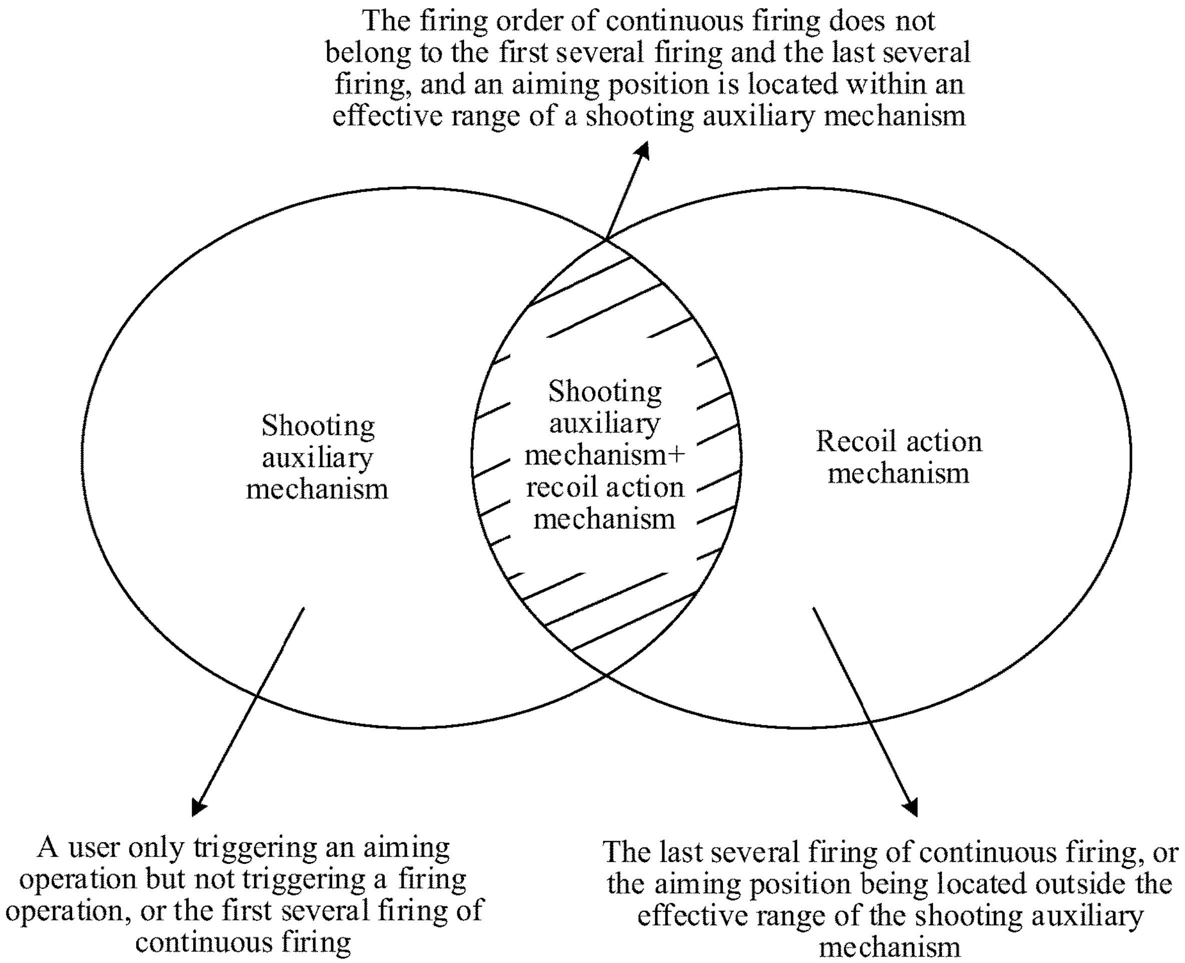
FIG. 6 exemplarily shows a schematic diagram of a relationship between a shooting auxiliary mechanism and a recoil action mechanism according to some embodiments.
Figure 7:
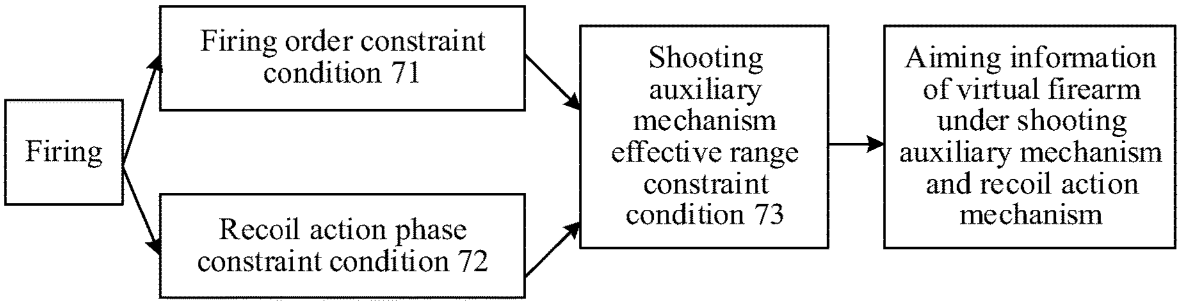
FIG. 7 exemplarily shows a schematic diagram of an aiming information determining mode according to some embodiments.

In addition, a situation that the shooting auxiliary mechanism and the recoil action mechanism take effect at the same time is mainly introduced above. As shown in FIG. 6, the shooting auxiliary mechanism and the recoil mechanism also take effect individually. When the user only triggers an aiming operation but does not trigger a firing operation, and during the first several firing of continuous firing, the shooting auxiliary mechanism takes effect individually. During the last several firing of continuous firing, and when the aiming position is located outside the effective range of the shooting auxiliary mechanism, the recoil mechanism takes effect individually. When the firing order of continuous firing does not belong to the first several firing and the last several firing, and the aiming position is located within the effective range of the shooting auxiliary mechanism, the shooting auxiliary mechanism and the recoil mechanism take effect together. As shown in FIG. 7, in this application, the aiming information of the virtual firearm under the shooting auxiliary mechanism and the recoil action mechanism is jointly determined from the three aspects of a firing order constraint condition 71, a recoil action phase constraint condition 72, and a shooting auxiliary mechanism effective range constraint condition 73.

Figure 8:
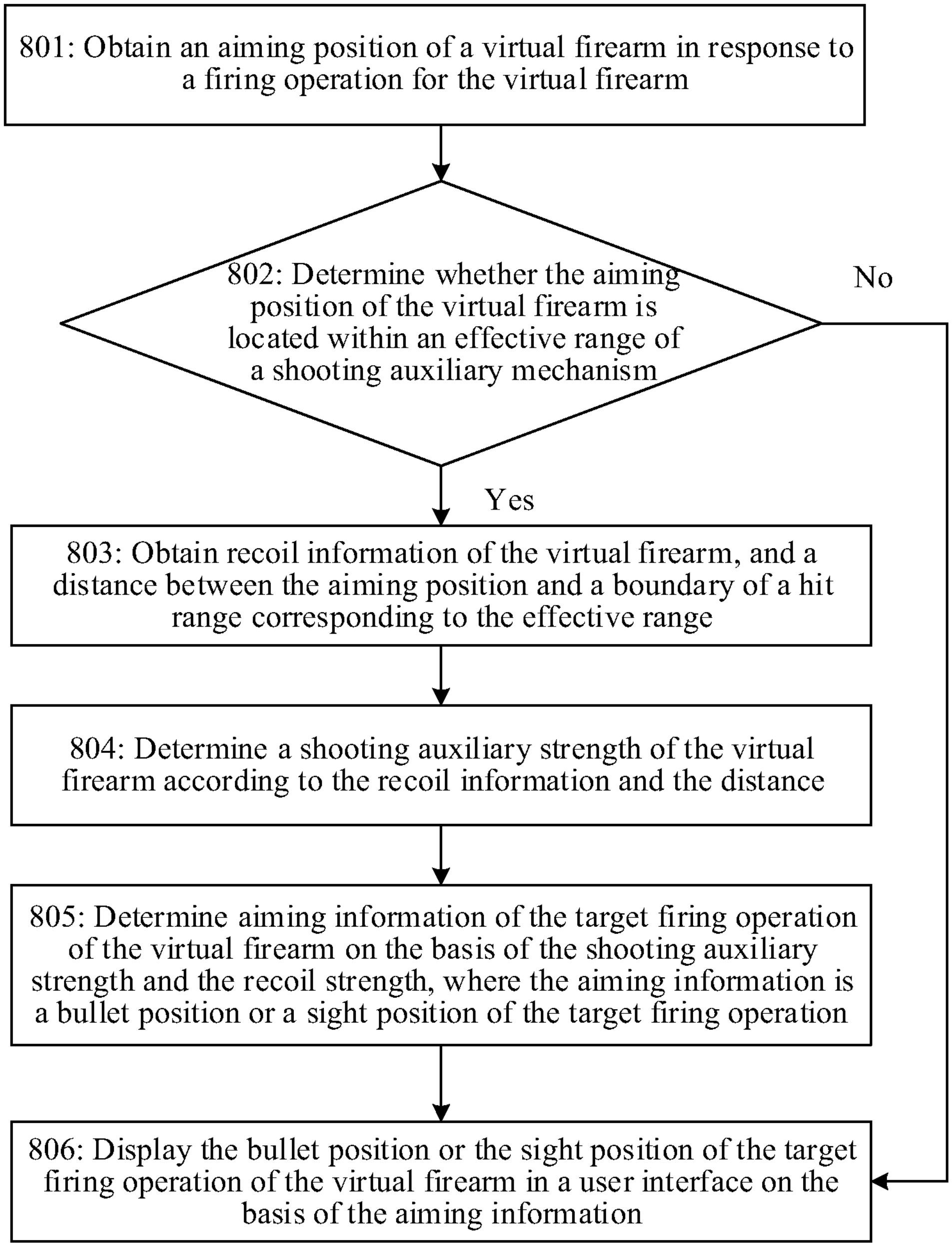
FIG. 8 exemplarily shows a schematic diagram of an aiming information determining process according to some embodiments.

In addition, some embodiments are completely introduced with reference to FIG. 8. The specific operations are as follow:

Operation 801: Obtain an aiming position of a virtual firearm in response to a firing operation for the virtual firearm.

Operation 802: Determine whether the aiming position of the virtual firearm is located within an effective range of a shooting auxiliary mechanism. If the aiming position of the virtual firearm is located within the effective range of the shooting auxiliary mechanism, operation 803 is executed; and if the aiming position of the virtual firearm is located outside the effective range of the shooting auxiliary mechanism, operation 806 is executed.

Operation 803: Obtain recoil information of the virtual firearm, and a distance between the aiming position and a boundary of a hit range corresponding to the effective range.

The recoil information may include: the order of the target firing operation in a plurality of continuous firing operations, a plurality of recoil action phases of the virtual firearm, and an auxiliary strength base corresponding to a firing state of the virtual firearm, the plurality of recoil action phases corresponding to different recoil strengths.

Operation 804: Determine a shooting auxiliary strength of the virtual firearm according to the recoil information and the distance.

According to the recoil information and the distance, the computer device may respectively determine a shooting auxiliary strength of each recoil action phase corresponding to a target firing operation of the virtual firearm.

Operation 805: Determine aiming information of the target firing operation of the virtual firearm on the basis of the shooting auxiliary strength and the recoil strength, the aiming information being a bullet position or a sight position of the target firing operation.

Operation 806: Display the bullet position or the sight position of the target firing operation of the virtual firearm in a user interface on the basis of the aiming information.

Apparatus embodiments of this application are described below, which may be used for executing the method embodiments of this application. For details not disclosed in the apparatus embodiments of this application, please refer to the method embodiments of this application.

Figure 9:
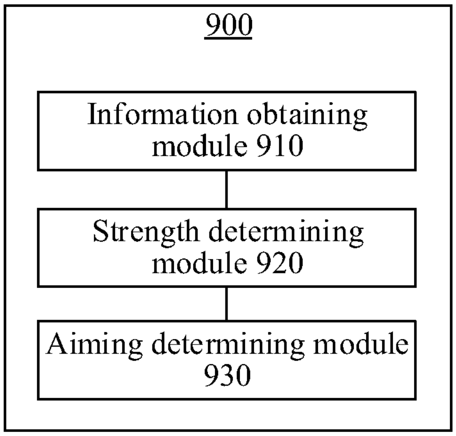
FIG. 9 is a block diagram of an information determining apparatus provided according to some embodiments.

FIG. 9 is a block diagram of an information determining apparatus provided according to some embodiments. The apparatus has functions of performing the foregoing information determining method, and the functions may be implemented by hardware or may be implemented by hardware executing corresponding software. The apparatus may be a terminal, or may be provided in a terminal. The apparatus 900 may include: an information obtaining module 910, a strength determining module 920, and an aiming determining module 930.

The information obtaining module 910 is configured to obtain recoil information of a virtual firearm in response to a target firing operation for the virtual firearm, the recoil information including information related to a recoil strength of the virtual firearm.

The strength determining module 920 is configured to determine a shooting auxiliary strength of the virtual firearm according to the recoil information, the shooting auxiliary strength being used for determining an offset for drawing an aiming position of the virtual firearm to a target object.

The aiming determining module 930 is configured to determine aiming information of the virtual firearm on the basis of the shooting auxiliary strength and the recoil strength.

In some embodiments, the recoil information includes an order of a target firing operation in a plurality of continuous firing operations, and the order is positively correlated with a recoil strength.

In some embodiments, the recoil information includes a plurality of recoil action phases of the virtual firearm, different recoil action phases correspond to different recoil strengths, and the shooting auxiliary strength includes shooting auxiliary strengths respectively corresponding to the plurality of recoil action phases.

In some embodiments, the recoil information includes an auxiliary strength base corresponding to a shooting state of the virtual firearm, different shooting states correspond to different recoil strengths, and different shooting states correspond to different auxiliary strength bases.

Figure 10:
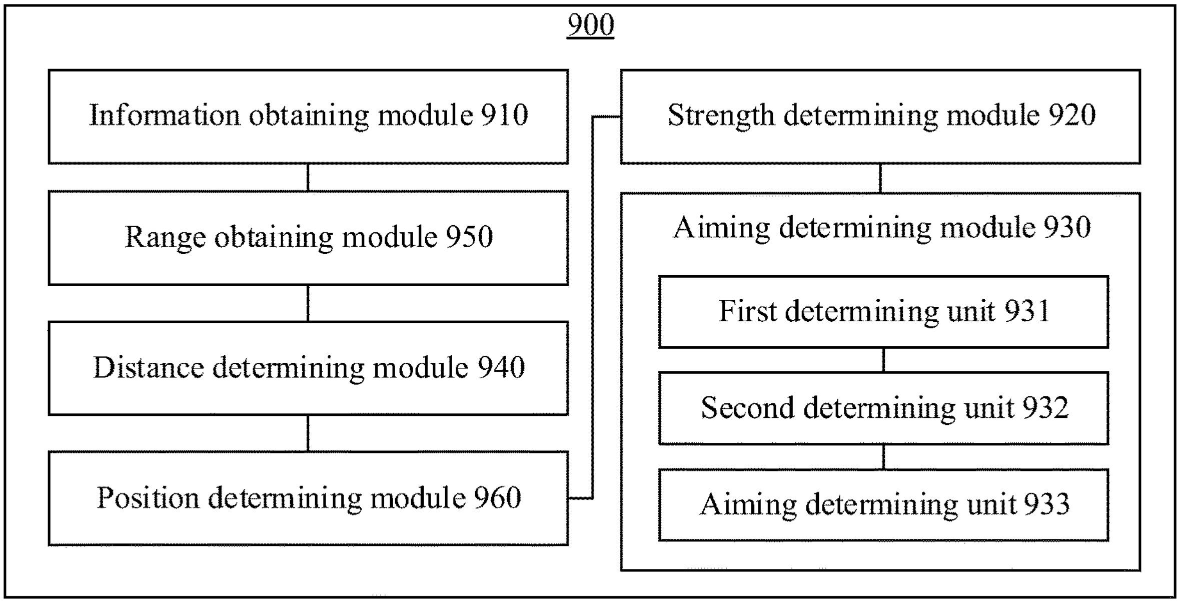
FIG. 10 is a block diagram of an information determining apparatus provided according to some embodiments.

In some embodiments, as shown in FIG. 10, the apparatus 900 further includes: a distance determining module 940.

The distance determining module 940 is configured to determine a distance between the aiming position of the virtual firearm and a boundary of a hit range of the target object. The hit range of the target object is an area for determining that the target object is hit.

The strength determining module 920 is configured to determine a shooting auxiliary strength according to the distance and the recoil information. The distance is negatively correlated with the shooting auxiliary strength.

In some embodiments, the strength determining module 920 is further configured to execute, in a case that the aiming position of the virtual firearm is located within an effective range of a shooting auxiliary mechanism, the operation of determining a shooting auxiliary strength of the virtual firearm according to the recoil information. The effective range is an area within a detection range of the target object excluding the hit range of the target object, the hit range of the target object is an area for determining that the target object is hit, and the detection range is an area which includes and is greater than the hit range of the target object.

In some embodiments, as shown in FIG. 10, the apparatus 900 further includes: a range obtaining module 950 and a position determining module 960.

The range obtaining module 950 is configured to obtain a hit range of the target object closest to the aiming position.

The distance determining module 940 is further configured to obtain a shortest distance between the aiming position and the hit range of the target object closest to the aiming position.

The position determining module 960 is configured to, in response to the shortest distance being less than or equal to a threshold, determine that the aiming position is located within the effective range of the shooting auxiliary mechanism.

In some embodiments, as shown in FIG. 10, the aiming determining module 930 includes: a first determining unit 931, a second determining unit 932, and an aiming determining unit 933.

The first determining unit 931 is configured to determine a first offset of an aiming position according to the shooting auxiliary strength.

The second determining unit 932 is configured to determine a second offset of the aiming position according to the recoil strength.

The aiming determining unit 933 is configured to adjust the aiming position of the virtual firearm according to the first offset and the second offset, to obtain aiming information of the virtual firearm.

In some embodiments, the first determining unit 931 includes: a first direction determining subunit and a first parameter determining subunit.

The first direction determining subunit is configured to determine a first offset direction of the aiming position according to a positional relationship between the aiming position and the target object. The first offset direction is an action direction of the shooting auxiliary strength.

The first parameter determining subunit is configured to determine a first displacement parameter of the aiming position according to the shooting auxiliary strength. The first displacement parameter is used for indicating a displacement distance of the aiming position in the first offset direction. The first offset includes the first offset direction and the first displacement parameter.

In some embodiments, the first direction determining subunit is configured to:

obtain a horizontal distance and a vertical distance between the aiming position and the target object;

determine, in response to the horizontal distance being less than the vertical distance, that the first offset direction is the horizontal direction; and determine, in response to the horizontal distance being greater than the vertical distance, that the first offset direction is the vertical direction.

In some embodiments, the first direction determining subunit is configured to:

obtain a connection line corresponding to a shortest distance between the aiming position and the target object; and determine a direction of the connection line as the first offset direction.

In some embodiments, the second determining unit 932 includes: a second direction determining subunit and a second parameter determining subunit.

The second direction determining subunit is configured to determine a second offset direction of the aiming position. The second offset direction is an action direction of the recoil strength, and the second offset direction includes a horizontal action direction and a vertical action direction.

The second parameter determining subunit is configured to determine a second displacement parameter of the aiming position according to the recoil strength. The second displacement parameter is used for indicating a displacement distance of the aiming position in the horizontal action direction, and a displacement distance of the aiming position in the vertical action direction. The second offset includes the second offset direction and the second displacement parameter.

In some embodiments, the second direction determining subunit is configured to determine the second offset direction on the basis of a shooting pose of the virtual firearm.

In some embodiments, the virtual firearm has a plurality of recoil action phases, and different recoil action phases correspond to different recoil strengths and different shooting auxiliary strengths.

In some embodiments, the aiming information includes at least one of the following: a sight position of the virtual firearm and a bullet position of the virtual firearm.

In summary, the aiming position of the virtual firearm is determined by means of the shooting auxiliary strength. That is, during a firing process of the virtual firearm, the aiming information is adjusted by means of the shooting auxiliary strength, thereby increasing the hit rate of the virtual firearm. Moreover, during the process of adjusting the aiming position of the virtual firearm according to the shooting auxiliary strength, the influence of the recoil of the virtual firearm on the aiming position is also considered, so that the content displayed by the aiming information of the virtual firearm is more realistic, that is, a virtual firing effect presented by the aiming information of the virtual firearm after firing better conforms to a real virtual firearm firing effect, thereby improving the user interaction experience and a shooting visual effect.

According to the apparatus provided in the foregoing embodiments, when the functions thereof are implemented, only division of the foregoing function modules is taken as an example for description. In practical application, the foregoing functions may be allocated to different function modules to be completed according to requirements. That is, the internal structure of a device is divided into different function modules, to complete all or some of the foregoing functions. In addition, the apparatus provided in the foregoing embodiments and the method embodiments belong to a same concept. For details of the specific implementation process, please refer to the method embodiments. Details are not described herein again.

Figure 11:
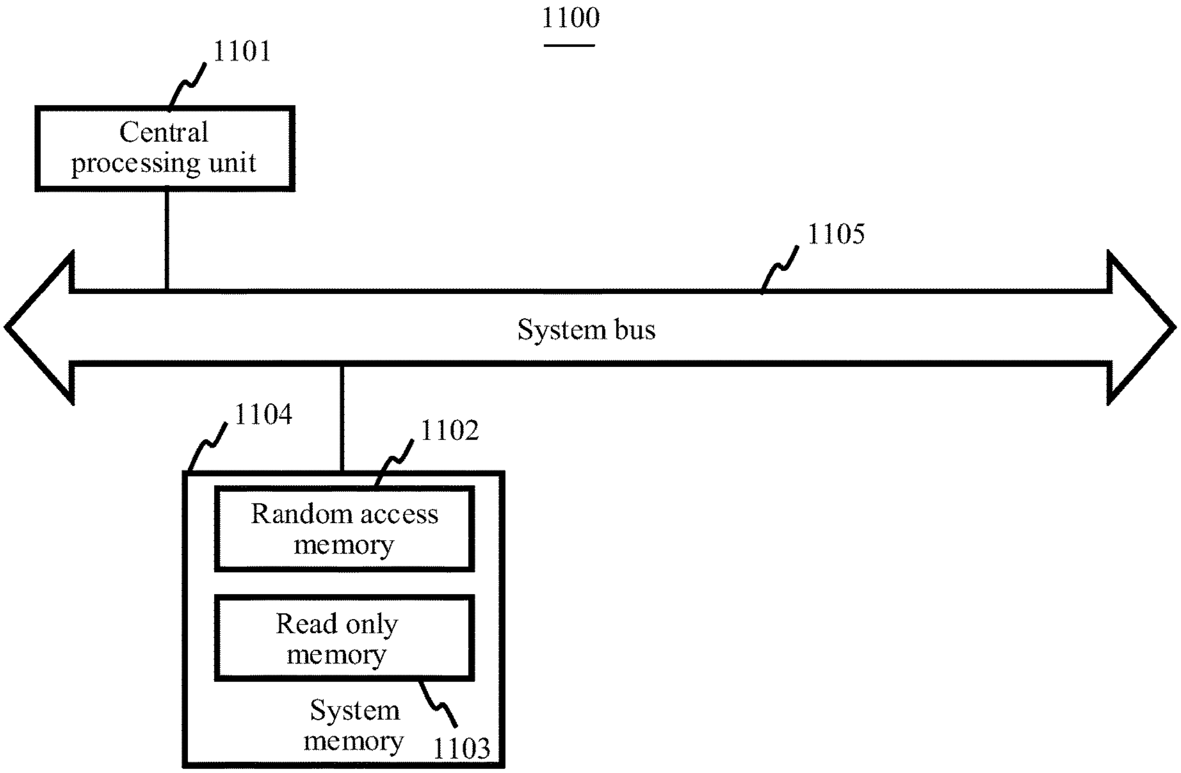
FIG. 11 is a structural block diagram of a computer device provided according to some embodiments.

FIG. 11 is a structural block diagram of a computer device provided according to some embodiments. The computer device may be configured to implement the functions of the foregoing information determining method. Specifically, a computer device 1100 includes a central processing unit (CPU) 1101, a system memory 1104 including a random access memory (RAM) 1102 and a read only memory (ROM) 1103, and a system bus 1105 connecting the system memory 1104 to the CPU 1101.

Generally, a computer-readable medium may include a computer-readable storage medium and a communication medium. The computer-readable storage medium includes volatile and non-volatile media, and removable and non-removable media implemented by using any method or technology used for storing information such as computer-readable instructions, data structures, program modules, or other data. The computer-readable storage medium includes an RAM, an ROM, an erasable programmable read only memory (EPROM), an electrically erasable programmable read only memory (EEPROM), a flash memory or other solid-state memory technologies, a CD-ROM, a digital video disc (DVD) or other optical memories, a tape cartridge, a magnetic cassette, a magnetic disk memory, or other magnetic storage devices. Certainly, a person skilled in art may know that the computer-readable storage medium is not limited to the foregoing several types.

According to some embodiments, the computer device 1100 may further be connected, through a network such as the Internet, to a remote computer on the network and run. That is, the computer device 1100 may be connected to a network by using a network interface unit connected to the system bus 1105, or may be connected to other types of networks or a remote computer system by using a network interface unit.

The memory further includes a computer-readable instruction, the computer-readable instruction being stored in the memory, and executed by one or more processor (that is, CPU), so as to implement the foregoing information determining method.

In some embodiments, a computer-readable storage medium is further provided, the storage medium storing at least one computer-readable instruction. When being executed by a processor, the at least one computer-readable instruction implements the foregoing information determining method.

The computer-readable storage medium may include: a read only memory (ROM), a random access memory (RAM), a solid state drive (SSD), a disc, or the like. The RAM may include a resistance random access memory (ReRAM) and a dynamic random access memory (DRAM).

In some embodiments, a computer program product or a computer program is further provided, the computer program product or the computer program including computer-readable instructions, and the computer-readable instructions being stored in a computer-readable storage medium. A processor reads and executes the computer-readable instructions from the computer-readable storage medium to implement the foregoing information determining method.

"A plurality of" mentioned herein means two or more. "And/or" describes an association relationship of associated objects and represents that there may be three relationships. For example, A and/or B may represent: only A, both A and B, and only B. The character "/" generally indicates an "or" relationship between the contextually associated objects. In addition, the operation numbers described in this description merely exemplarily show a possible execution sequence of the operations. In some other embodiments, the operations may not be performed according to the number sequence. For example, two operations with different numbers may be performed simultaneously, or two operations with different numbers may be performed according to a sequence contrary to the sequence shown in the figure. This is not limited in the embodiments of the disclosure.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A method for simulating a virtual game on a display device, the method being performed by at least one processor, and the method comprising:

controlling the display device to display a first virtual scene comprising a virtual object holding a virtual firearm that is aimed at a target object;

determining that an aiming position of the virtual firearm is within an aiming assistance range of the target object;

determining, in response to receiving operation instructions associated with performance of a sequence of consecutive target firing operations of the virtual firearm within the virtual game, an aiming assistance strength of the virtual firearm based on the sequence and a recoil strength of the virtual firearm based on the sequence, wherein the aiming assistance strength reduces as a number of target firing operations in the sequence increases, and wherein the recoil strength increases as the number of the target firing operations in the sequence increases;

obtaining a first offset associated with the aiming position based on the aiming assistance strength and a second offset associated with the aiming position based on the recoil strength, the first offset and the second offset being indicative of an offset of the aiming position from the target object;

controlling the display device to display a simulation wherein the virtual firearm shoots the target object based on the aiming position, the first offset, and the second offset; and controlling the display device to further display a jitter animation of the firearm in combination with the simulation responsive to the virtual firearm shooting the target object, the jitter animation of the firearm simulating a jitter of the firearm based on the aiming position and the recoil strength.

2. The method according to claim 1, wherein determining the aiming assistance strength of the virtual firearm based on the sequence comprises:

counting an ordinal number of a current firing operation in the sequence of consecutive target firing operations; and determining the aiming assistance strength based on the ordinal number, wherein the aiming assistance strength negatively correlates to the ordinal number.

3. The method according to claim 1, wherein determining the aiming assistance strength of the virtual firearm based on the sequence comprises:

determining the recoil strength of the virtual firearm based on an ordinal number of a current firing operation in the sequence of consecutive target firing operations.

4. The method according to claim 1, wherein the aiming assistance range of the target object surrounds a hit range of the target object and does not include the hit range of the target object.

5. The method according to claim 1, further comprising: determining the aiming assistance strength based on a distance between the aiming position of the virtual firearm and a hit range of the target object, wherein the distance negatively correlates to the aiming assistance strength.

6. The method according to claim 1, further comprising: determining the aiming assistance strength of the virtual firearm based on a current phase of a shooting, wherein a shooting comprises a plurality of phases.

7. The method according to claim 6, wherein recoil of a shooting comprises a lifting phase, a staying phase, and a falling phase.

8. An apparatus for simulating a virtual game on a display device, comprising:

at least one memory configured to store program code; and at least one processor configured to read the program code and operate as instructed by the program code, the program code comprising:

displaying code configured to cause the at least one processor to control the display device to display a first virtual scene comprising a virtual object holding a virtual firearm that is aimed at a target object;

first determining code configured to cause the at least one processor to determine that an aiming position of the virtual firearm is within an aiming assistance range of the target object;

second determining code configured to cause the at least one processor to determine, in response to receiving operation instructions associated with performance of a sequence of consecutive target firing operations of the virtual firearm within the virtual game, an aiming assistance strength of the virtual firearm based on the sequence and a recoil strength of the virtual firearm based on the sequence, wherein the aiming assistance strength reduces as a number of target firing operations in the sequence increases, and wherein the recoil strength increases as the number of the target firing operations in the sequence increases;

offset code configured to cause the at least one processor to obtain a first offset associated with the aiming position based on the aiming assistance strength and a second offset associated with the aiming position based on the recoil strength, the first offset and the second offset being indicative of an offset of the aiming position from the target object;

first controlling code configured to cause the at least one processor to control the display device to display a simulation wherein the virtual firearm shoots the target object based on the aiming position, the first offset, and the second offset; and second controlling code configured to cause the at least one processor to control the display device to display a jitter animation of the firearm in combination with the simulation responsive to the virtual firearm shooting the target object, the jitter animation of the firearm simulating a jitter of the firearm based on the aiming position and the recoil strength.

9. The apparatus according to claim 8, wherein the second determining code is further configured to cause the at least one processor to:

count an ordinal number of a current firing operation in the sequence of consecutive target firing operations; and determine the aiming assistance strength based on the ordinal number, wherein the aiming assistance strength negatively correlates to the ordinal number.

10. The apparatus according to claim 8, wherein the second determining code further comprises:

third determining code configured to cause the at least one processor to determine the recoil strength of the virtual firearm based on an ordinal number of a current firing operation in the sequence of consecutive target firing operations.

11. The apparatus according to claim 8, wherein the aiming assistance range of the target object surrounds a hit range of the target object and does not include the hit range of the target object.

12. The apparatus according to claim 8, wherein the program code further comprises:

fourth determining code configured to cause the at least one processor to determine the aiming assistance strength based on a distance between the aiming position of the virtual firearm and a hit range of the target object, wherein the distance negatively correlates to the aiming assistance strength.

13. The apparatus according to claim 8, wherein the program code further comprises:

fifth determining code configured to cause the at least one processor to determine the aiming assistance strength of the virtual firearm based on a current phase of a shooting, wherein a shooting comprises a plurality of phases.

14. The apparatus according to claim 13, wherein recoil of a shooting comprises a lifting phase, a staying phase, and a falling phase.

15. A non-transitory computer-readable storage medium, storing a computer program with instructions that when executed by at least one processor causes the at least one processor to:

control a display device to display a first virtual scene comprising a virtual object holding a virtual firearm that is aimed at a target object;

determine that an aiming position of the virtual firearm is within an aiming assistance range of the target object;

determine, in response to receiving operation instructions associated with performance of a sequence of consecutive target firing operations of the virtual firearm within the virtual game, an aiming assistance strength of the virtual firearm based on the sequence and a recoil strength of the virtual firearm based on the sequence, wherein the aiming assistance strength reduces as a number of target firing operations in the sequence increases, and wherein the recoil strength increases as the number of the target firing operations in the sequence increases;

obtain a first offset associated with the aiming position based on the aiming assistance strength and a second offset associated with the aiming position based on the recoil strength, the first offset and the second offset being indicative of an offset of the aiming position from the target object;

control the display device to display a simulation wherein the virtual firearm shoots the target object based on the aiming position, the first offset, and the second offset; and control the display device to further display a jitter animation of the firearm in combination with the simulation responsive to the virtual firearm shooting the target object, the jitter animation of the firearm simulating a jitter of the firearm based on the aiming position and the recoil strength.

16. The non-transitory computer-readable storage medium according to claim 15, wherein the instructions that cause the at least one processor to determine the aiming assistance strength of the virtual firearm further causes the at least one processor to:

count an ordinal number of a current firing operation in the sequence of consecutive target firing operations; and determine the aiming assistance strength based on the ordinal number, wherein the aiming assistance strength negatively correlates to the ordinal number.

17. The non-transitory computer-readable storage medium according to claim 15, wherein the computer program further comprises instructions that cause the at least one processor to:

determine the recoil strength of the virtual firearm based on an ordinal number of a current firing operation in the sequence of consecutive target firing operations.

18. The non-transitory computer-readable storage medium according to claim 15, wherein the aiming assistance range of the target object surrounds a hit range of the target object and does not include the hit range of the target object.

19. The non-transitory computer-readable storage medium according to claim 15, wherein the computer program further comprises instructions that cause the at least one processor to:

determine the aiming assistance strength based on a distance between the aiming position of the virtual firearm and a hit range of the target object, wherein the distance negatively correlates to the aiming assistance strength.

20. The non-transitory computer-readable storage medium according to claim 15, wherein the computer program further comprises instructions that cause the at least one processor to:

determine the aiming assistance strength of the virtual firearm based on a current phase of a shooting, wherein a shooting comprises a plurality of phases.

* * * * *